United States Patent

Hildebrand et al.

[11] Patent Number: 5,423,888
[45] Date of Patent: Jun. 13, 1995

[54] REACTIVE DYESTUFF GREEN MIXTURE HAVING REDUCED DICHROISM

[75] Inventors: Dietrich Hildebrand; Joachim Wolff, both of Odenthal; Rolf Schulz, Cologne, all of Germany

[73] Assignee: Bayer Aktiengesellschaft, Leverkusen, Germany

[21] Appl. No.: 200,984

[22] Filed: Feb. 24, 1994

[30] Foreign Application Priority Data

Mar. 3, 1993 [DE] Germany .......................... 43 06 613.5

[51] Int. Cl.⁶ .......................... D06P 3/87; D06P 3/66; C09B 62/00
[52] U.S. Cl. ............................ 8/532; 8/549; 8/638; 8/641; 8/661; 8/686; 8/688; 8/689; 8/918; 8/922
[58] Field of Search .................... 8/532, 543, 549, 638, 8/641, 661, 918, 685–689, 918–922

[56] References Cited

U.S. PATENT DOCUMENTS

| | | |
|---|---|---|
| 4,072,463 | 2/1978 | Schläfer et al. |
| 4,338,093 | 7/1992 | Hildebrand et al. |
| 4,557,731 | 12/1985 | Sasakura et al. |
| 4,705,524 | 11/1987 | Hahnke et al. |
| 4,711,641 | 12/1987 | Nakamatsu et al. ......... 8/524 |
| 5,047,067 | 9/1991 | Miyazaki et al. |
| 5,070,193 | 12/1991 | Schundehutte et al. ......... 540/125 |
| 5,163,971 | 11/1992 | Stawitz et al. |
| 5,232,462 | 8/1993 | Tzikas. |
| 5,279,622 | 1/1994 | Stawitz et al. |

FOREIGN PATENT DOCUMENTS

| | | |
|---|---|---|
| 0198198 | 10/1986 | European Pat. Off. |
| 0472968 | 3/1992 | European Pat. Off. |
| 3718397 | 12/1988 | Germany. |
| 2250297 | 6/1992 | United Kingdom. |

OTHER PUBLICATIONS

JPA 01 144467 Jun. 6, 1989 Sumitoto abstract.
JP-A-01 1,043,568, Sumitomo Abstract of JP200464 Oct. 8, 1987.

Primary Examiner—Paul Lieberman
Assistant Examiner—Margaret Einsmann
Attorney, Agent, or Firm—Sprung Horn Kramer & Woods

[57] ABSTRACT

A reactive dyestuff mixture contains at least one vinylsulphonylphthalocyanine dyestuff, at least one Ni fluoro-chloropyrimidenyl phthalocyanine dyestuff and/or one Ni chlorotriazinyl-phthalocyanine dyestuff.

7 Claims, No Drawings

REACTIVE DYESTUFF GREEN MIXTURE HAVING REDUCED DICHROISM

The invention relates to mixtures of Ni phthalocyanine reactive dyestuffs which when used for dyeing cellulose or regenerated cellulose fibres have reduced dichroism compared with that of the individual components.

Dichroism is the property of dyestuffs that dyeings produced by them, upon exhaustion of the dye bath, exhibit a more or less pronounced difference in colour on the individual fibres present side by side in the fibre collective. In the case of Ni phthalocyanine reactive dyestuffs this leads to an unlevel appearance and a shift in the hue upon changing the light source and the angle of illumination. Although quantitative identification of this undesirable property has not yet been established, in practice the dyeings are evaluated with respect to their dichroism. When green shades are compared, those dyeings which exhibit the lowest dichroism are given the highest rating.

In the case of reactive dyestuffs on cellulose and/or regenerated cellulose fibres, this property leads to particular problems because reactive dyestuffs are used on cellulose fibres especially because of their brilliance in demanding, highly fashionable designs. A shift in hue from the blue to the yellow side of a brilliant green dyeing or a green combination dyeing, which exhibits a dichroic appearance when illumination conditions change, thus constitutes a substantial reduction in value of the corresponding dyeing. Accordingly, those dyestuffs are preferred which produce non-dichroic dyeings of high fibre-levelness and display only a slight shift in hue, i.e. a high constancy in colour, upon change in light and under different viewing angles.

Reactive dyestuffs are used for the dyeing of cellulose fibres in the form of their individual components or in the form of combinations of various dyestuffs of the stone type.

Mixtures of reactive dyestuffs for dyeing, in particular, cellulose fibres and fibre blends are already known. U.S. Pat. No. 4,338,093 relates to mixtures of reactive dyestuffs which produce the same hue but have different reactivities. DE-A-3,718,397 describes mixtures of formazan reactive dyestuffs. U.S. Pat. No. 5,047,067 describes mixtures of reactive dyestuffs having different reactive groups, and different substantivities but approximately the same hue.

According to EP-A-113,251, fibre blends are dyed with a dyestuff mixture containing a dyestuff having two reactive groups and a dyestuff having one reactive group.

EP-A-458,152, JP-A-01,144,467, JP-A-0,143,567 and JP-A-0,143,568 describe reactive dyestuff mixtures containing phthalocyanines.

In a combination, the rates of fixation of the individual components of the combination should ideally be identical, or at least similar in order to ensure compatibility of the dyestuffs during the dyeing process and thus obtain a "solid", level appearance. If reactive dyestuffs exhibit different reactivities and substantivities and, accordingly, different rates of fixation, they are regarded as belonging to different dyestuff types which have to be applied using different alkali and temperature conditions. Accordingly, in the case of dyestuff mixtures, different reactivities and substantivities result in different exhaustion behaviours, i.e. the dyestuff mixtures do not show on-tone exhaustion over the timecourse of fixation. To a first approximation, the reactivity of a reactive dyestuff is determined by the chemical structure of its reactive group.

The fact that the exhaustion, diffusion and fixation behaviours of Ni phthalocyanine reactive dyestuffs differ greatly from those of the customary reactive dyestuffs has led to the prejudice against using Ni phthalocyanine reactive dyestuffs having different reactive groups in the form of mixtures for simultaneous dyeing by the same dyeing procedure, i.e. under identical alkali, salt and temperature conditions.

Reactive dyestuffs for the dyeing of cellulose fibres are used in particular for dyeing fashionable shades of high colour strength. The special difficulty of this is how to produce dyeings of high levelness in the brilliant green range using in particular Ni phthalocyanine. The production of level dyeings based on a uniform reactive dyestuff molecule by means of the currently available dyestuffs is not yet adequately possible since cellulose fibres tend towards a non-uniform, i.e. dichroic, uptake of the Ni phthalocyanine chromophone when brilliant green dyeings are produced, if, as is customary, only dyestuffs of one molecular structure are used.

Apart from the problem of fibre unlevelness, which is referred to as dichroism, Ni phthalocyanine reactive dyestuffs when used as a type also exhibit, as is known, the problem of surface levelness. This means that reactive dyestuffs which in each case correspond to one reactive type, which are designated, for example, either as vinylsulphonyl or as fluorochloropyrimidines, lead in practice on average much more frequently to unlevel dyeings than do other classes of dyestuffs.

The object of the invention is to provide reactive dyestuff mixtures for the improved production of ontone brilliant green dyeings having improved dichroism and improved solubility and showing a uniform course of fixation.

The dyestuff mixture should exhibit time- and hue-invariant surface level and reproducible dyeing behaviour.

The present invention provides an Ni phthalocyanine reactive dyestuff mixture of at least two reactive dyestuffs having a different reactive group, characterized in that at least one Ni vinylsulphonylphthalocyanine dyestuff 1 of the formula 1.1

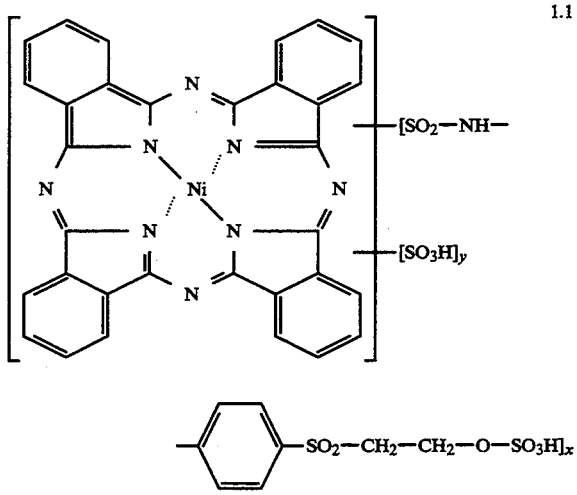

in which
  x is 1 to 3, in particular 1 to 2, especially 1.3 to 1.8,
  y is 1 to 3, in particular 1.5 to 2
  x+y is about 3 to 4,
at least one Ni fluoro-chloro-pyrimidyl-phthalocyanine dyestuff 2 of the formulae 2.1 or 2.2

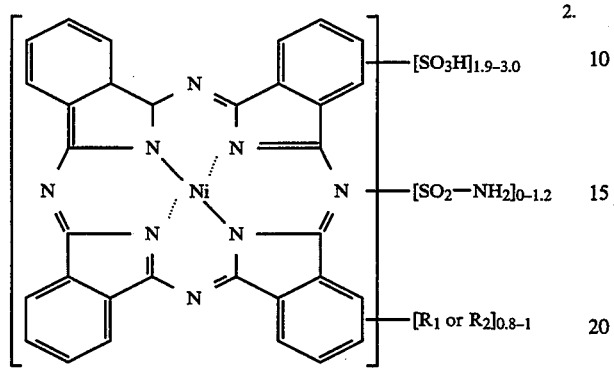

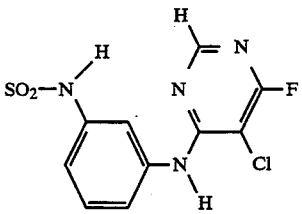

2.1

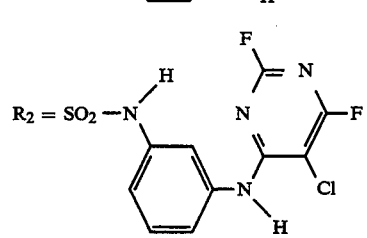

2.2 and/or at least one Ni chloro-triazinyl-phthalocyanine reactive dyestuff 3 of the formulae 3.1 and 3.2

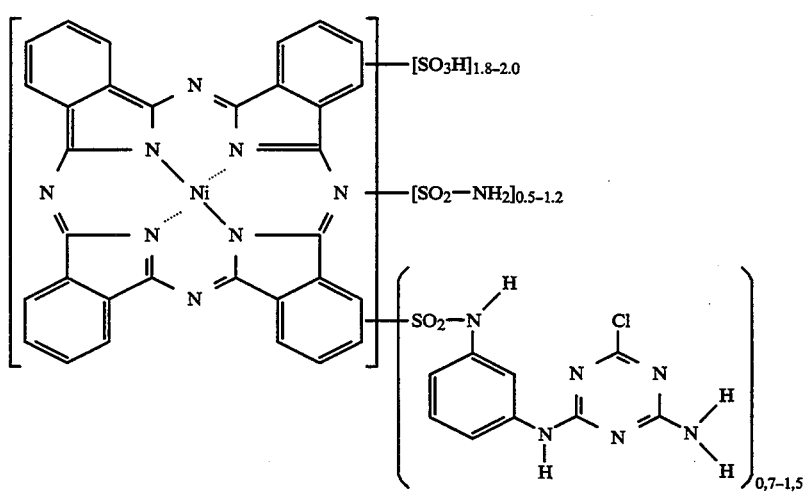

3.1

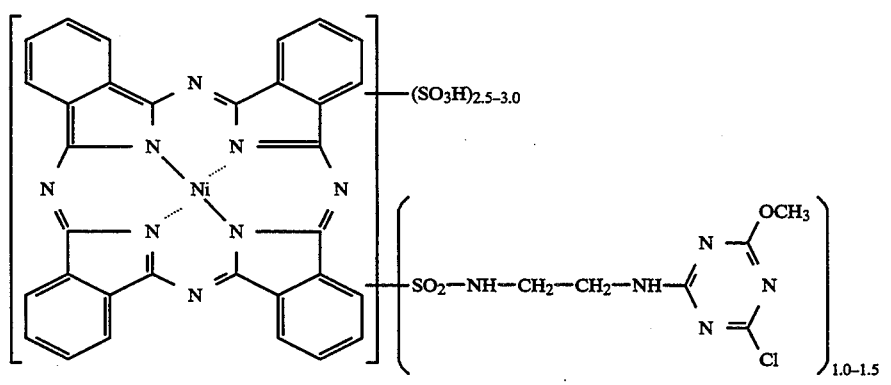

3.2 in which are contained therein.

In addition, at least one dyestuff 4 of the following formulae 4.1 to 4.3 can, if desired, be contained therein:

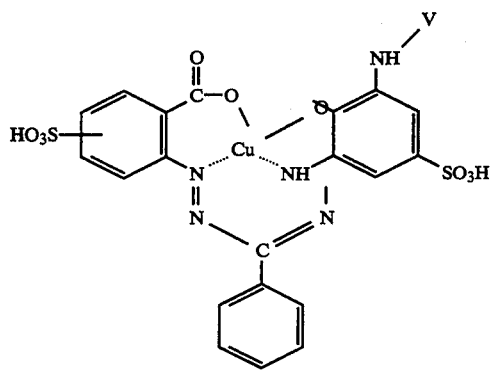

4.

wherein V may be $V_1$–$V_3$ and in which

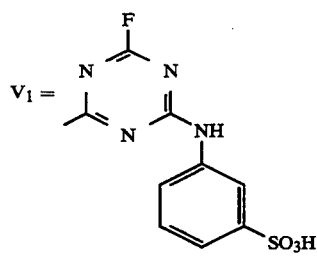

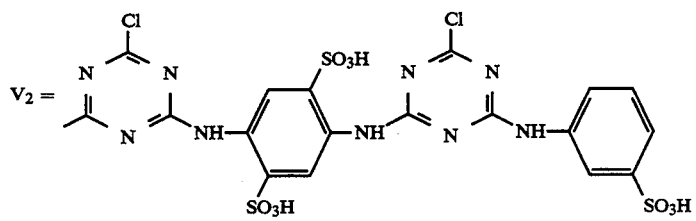

4.1

4.2 in which U denotes H, $CH_3$ or $-C_2H_5$.

When used for dyeing on cellulose fibres, the mixtures according to the invention produce brilliant neutral green and blue shades having reduced dichroism and time- and hue-invariant level exhaustion characteristics. Furthermore, the mixtures according to the invention are suitable not only for producing level, non-dichroic green hues but also, in combination with yellow and red reactive dyestuffs, for producing surprisingly level, non-dichroic brown and beige hues and, in combination with navy and black brands, for producing deep blue shades, which, if only one of the two uniform Ni phthalocyanine dyestuffs is used instead of using the mixture according to the invention, cannot be safely dyed because of the appearance produced and are therefore usually not used.

During exhaustion onto and fixation on cellulose fibres, especially when employed in short liquor ratios, the dyestuff mixtures to be used according to the invention lead to a better, i.e. non-dichroic, appearance than the Ni phthalocyanine reactive dyestuffs usually used on their own. A further advantage of the mixtures according to the invention is the improved dyestuff solubility in the presence of electrolyte. This is particularly true in the presence of the electrolyte used for the exhaustion process from a long liquor, such as sodium chloride and sodium sulphate. In the presence of salt, the dyestuff of the mixture not only exhibits better solubility in water but also better liquor stability with respect to the absorption behaviour of the cotton, in that a uniform exhaustion process takes place and the dyestuff is not prematurely selectively precipitated or absorbed on the cellulose fibre.

Another surprising fact is that a mixture of a Ni vinylsulphonylphthalocyanine reactive dyestuff and a Ni fluorochloropyrimidylphthalocyanine will produce level dyeings in the piece, so that bright level green dyeings having decreased dichroism and improved surface-levelness can be obtained without the dyed material undergoing a change in hue during the dyeing process. This improves their usefulness in the case of relatively difficult-to-displace fabric grades and creasing in the dyeing machine. Finally, during fixation, the dyestuff mixtures according to the invention exhibit ontone bath exhaustion and a slow build-up of the shade of the dyeing.

For better handling, the mixtures according to the invention contain dispersants, in particular 0.5 to 10 parts by weight of an organic anionic dispersant and hexapolyphosphates, relative to the entire mixture, and a dustproofing agent, preferably 0.5 to 5 parts by weight, relative to the entire mixture. The mixture according to the invention can be used in the form of a powder or granules or else in the form of a liquid mix. Unless stated otherwise, the parts given below are by weight.

Particularly preferred mixtures are listed below:
Mixture 1: dyestuffs 1.1, 2.1
Mixture 3: dyestuffs 1.1, 2.2
Mixture 5: dyestuffs 1.1, 3.1
Mixture 7: dyestuffs 1.1, 3.2
Mixture 9: dyestuffs 1.1, 2.1 and 2.2
Mixture 10: dyestuffs 1.1, 2.2 and 4.2
Mixture 11: dyestuffs 1.1, 2.2 and 4.3

In a preferred embodiment, the mixtures contain, relative to the entire dyestuff content:
Dyestuff 1:40 to 60, in particular 30 to 50, % by weight
Dyestuff 2:40 to 60, in particular 30 to 50, % by weight
Dyestuff 3: 0 to 60, in particular 0 to 40, % by weight
Dyestuff 4: 0 to 40, in particular 0 to 30, % by weight In addition, further dyestuffs or customary aids can be used. The dyestuff mixtures according to the invention contain in particular 1 to 50 parts of an inorganic salt, such as, for example, sodium chloride or sodium sulphate, per 100 parts of dyestuff. The mixtures according to the invention furthermore preferably contain a buffer, in particular 1 to 5 parts of an inorganic buffer having a buffering range of between pH 6.5 and 7.5

The dyestuff mixture can be used not only for dyeing by the exhaust method but also for dyeing by the pad-steam and cold pad-batch methods. Suitable materials are not only pure cellulose fibre materials but also their blends with polyester, such as polyester/cotton, polyester/viscose, polyester/linen and various cellulose fibre blends, such as cotton/staple viscose or cotton/linen. The main areas of application of the mixture are the dyeing of cotton yarn, woven and knitted cotton fabric and terry goods.

The mixtures according to the invention are suitable for dyeing by the exhaust method in accordance with the following procedure:

| Time (min) | Temp. (°C.) | Operation |
|---|---|---|
| 10 | 60 | Addition of dyestuff |
| 40 | 60 | Addition of salt in portions (50–80 g/l) |
| 70 | 60 | Addition of alkali (20 g/l of sodium carbonate) |
| 90 | 80–95 | Heating at 1° C./minute |
| 120 | 80–95 | Dyeing |
| 130 | 50 | Warm rinse |
| 140 | 50 | Discharge and refill |
| 150 | 50 | Warm rinse |
| 160 | 50 | Discharge and refill |
| 170 | 80 | Hot rinse |
| 180 | 80 | Discharge and refill |
| 190 | 80 | Hot rinse |
| 200 | 80 | Discharge and refill |
| 215 | 95 | Hot rinse |
| 220 | 95 | Hot discharge via overflow |
| 225 | 80 | Warm rinse via overflow |
| 230 | 20 | Cold rinse |
| 240 | 20 | Remove dyed material. |

The mixtures according to the invention are also suitable for dyeing by the padding method, preferably in accordance with the following guide recipes:

A) Cold pad-batch method Guide recipe:
  1) 1000 parts of padding liquor contain
   1–80 parts of dyestuff
   50–100 parts of waterglass of spec. weight 1.5
   7.5–15 parts of sodium hydroxide solution of spec. weight 1.5
   0–100 parts of urea
   0–2 parts of wetting agent
   0–20 parts of thickener
  2) 1000 parts of padding liquor contain
   1–80 parts of dyestuff
   8–20 parts of sodium carbonate
   1–12 parts of sodium hydroxide solution of spec. weight 1.5
   0–100 parts of urea
   0–2 parts of wetting agent
   0–2 parts of thickener
   Liquor pickup 50–120%
   Temperature of padding liquor 20°–30° C.
   Residence time 24–48 hours B) Single-bath pad-steam method with drying in between Guide recipe:
  1000 parts of padding liquor contain
  1–80 parts of dyestuff
  1–4 parts of wetting agent
  3–20 parts of thickener
  5–20 parts of anhydrous sodium carbonate
  0–100 parts of urea
  3–5 parts of m-nitrobenzenesulphonate

| Process conditions: | |
|---|---|
| Temperature of padding liquor | 20–30° C. |
| Liquor pickup | 50–70% |
| Drying time | 1–2 minutes |
| Drying temperature | 120–140° C. |
| Steaming temperature | 102–108° C. |
| Steaming time | 1–8 minutes |

C) Single-bath pad-steam method without drying in between Guide recipe:
  1000 parts of padding liquor contain
  1–80 parts of dyestuff
  1–4 parts of wetting agent
  10–20 parts of sodium bicarbonate or
  10–20 parts of 50:50 sodium bicarbonate/sodium carbonate
  3–5 parts of m-nitrobenzenesulphonate

| Process conditions: | |
|---|---|
| Temperature of padding liquor | 20–30° C. |
| Liquor pickup | 50–70% |
| Steaming temperature | 102–108° C. |
| Steaming time | 1–8 minutes |

D) Two-bath pad-steam method with drying in between Guide recipe:
  1000 parts of padding liquor contain
  1–80 parts of dyestuff
  1–4 parts of wetting agent
  5–20 parts of thickener
  Chemical padding liquor:
  1000 parts of chemical padding liquor contain 250 parts of sodium chloride
  20–40 parts of anhydrous sodium carbonate and/or
  20 parts of sodium hydroxide solution of spec. weight 1.5

| Process conditions: | |
|---|---|
| Temperature of padding liquor | 20–20° C. |
| Liquor pickup | 50–70% |
| Drying time | 1–2 minutes |
| Drying temperature | 120–140° C. |
| Liquor pickup in the chemical pad | 30–40% |
| Steaming time | 1–8 minutes |
| Steaming temperature | 102–108° C. |

E) Two-bath pad-steam method without drying in between Guide recipe:
  1.000 parts of padding liquor contain
  1–80 parts of dyestuff
  1–40 parts of wetting agent
  Chemical padding liquor:
  1000 parts of chemical padding liquor contain 250 parts of sodium chloride
  20–40 parts of anhydrous sodium carbonate and/or
  20 parts of sodium hydroxide solution of spec. weight 1.5

| Process conditions: | |
|---|---|
| Temperature of padding liquor | 20–30° C. |
| Liquor pickup | 50–70% |
| Liquor pickup in the chemical pad | 20–50% |
| Steaming time | 1–8 minutes |
| Steaming temperature | 102–108° C. |

F) Pad-cure method Guide recipe:
  1000 parts of padding liquor contain
  1-40 parts of dyestuff
  1-4 parts of wetting agent
  5-10 parts of sodium carbonate and/or
  5-10 parts of sodium bicarbonate
  5-20 parts of thickener
  3-5 parts of m-nitrobenzenesulphonate

| Process conditions: | |
| --- | --- |
| Temperature of padding liquor | 20-30° C. |
| Liquor pickup | 50-70% |
| Drying temperature | 120-140° C. |
| Drying time | 1 minute |
| Curing temperature | 140-160° C. |
| Curing time | 1 minute |

EXAMPLE 1

On a winch, 1000 parts of an aqueous dyeing liquor are admixed at 60° C. with 100 parts of a bleached knitted cotton fabric and 3 parts of a reactive dyestuff mixture. The mixture consists of 50 parts of the dyestuff 1.1 ($\lambda_{max}=621$ nm) and 50 parts of the dyestuff 2.1 ($\lambda_{max}=656$ nm).

After uniform distribution of the dyestuff mixture in the liquor and on the cotton within 15 minutes, 50 parts of sodium chloride are added to the dyeing liquor over a period of 30 minutes, and 20 parts of sodium carbonate are then added at 10 minute intervals in 3 portions each of 1 part, 2 parts and 7 parts each. The material to be dyed is then heated to 80° C. over a period of 30 minutes and treated at this temperature for 30 minutes. The liquor is then discharged, and the material is rinsed twice at 60° C. and twice at 80° C. This is followed by 15 minutes of extraction at the boil and discharge of the wash liquor. Cold rinsing gives a bright turquoise green dyeing having good fastness properties.

The dyeing obtained is more level than dyeing obtained by the same dyeing scheme in which in each case 3 parts of dyestuff 1.1 or dyestuff 2.1 were exclusively used.

EXAMPLE 2

On a commercial jet-dyeing machine, 800 parts of an aqueous dyeing liquor are admixed at 30° C. with 100 parts of a knitted cotton fabric and 40 parts of sodium sulphate.

This in followed by heating to 60° C. over a period of 15 minutes and addition, over a period of 30 minutes, of 100 parts of a dyestuff solution consisting of
3 parts of a mixture of
40 parts of dyestuff 1.1 and
60 parts of dyestuff 2.1.

20 parts of anhydrous sodium carbonate dissolved in 100 parts of water are then added over a period of 30 minutes. After 15 minutes, the material to be dyed is heated to 90° C. over a period of 30 minutes and treated at this temperature for 15 minutes.

The liquor is then discharged, and the material is rinsed twice at 60° C. and twice at 80° C. It is then soaped at the boil for 15 minutes, and the wash liquor is discharged. Cold rinsing gives a bright turquoise green dyeing having improved levelness.

EXAMPLE 3

100 parts of bleached cotton knitwear are treated on a commercial jet-dyeing machine with 800 parts of a hot dyeing liquor at 60° C. which contains
40 parts of sodium chloride
20 parts of anhydrous sodium carbonate
4 parts of the dyestuff mixture consisting of
50 parts of dyestuff 1.1 ($\lambda_{max}=621$ nm)
25 parts of dyestuff 2.1 ($\lambda_{max}=656$ nm) and
25 parts of dyestuff 2.2 ($\lambda_{max}=657$ nm).

The bath is heated to 80° C. over a period of 20 minutes and maintained at this temperature for 60 minutes. After this time the liquor is discharged and the material is rinsed twice with 800 parts of a hot liquor at 60° C. for 10 minutes each and twice with 800 parts of a hot liquor at 80° C.

Fresh liquor is then added and the whole is heated to 95° C., followed by 20 minutes of extraction at the boil. Discharge of the wash liquor is followed by a cold rinse.

This gives a bright turquoise green dyeing having improved levelness.

EXAMPLE 4

100 parts of a bleached cotton yarn are treated on a commercial yarn-dyeing machine at a liquor circulation of 271 kg/minute with 750 parts of a hot dyeing liquor at 60° C. which contains
40 parts of anhydrous sodium sulphate
10 parts of anhydrous sodium carbonate
5 parts of a dyestuff mixture consisting of
30 parts of dyestuff 1.1
30 parts of dyestuff 2.1 and
40 parts of dyestuff 3.2.

The bath is heated to 80° C. over a period of 20 minutes and maintained at this temperature for 60 minutes. After this time the liquor is discharged and the material is rinsed twice with 750 parts of a hot liquor at 60° C. The machine is then refilled with 750 parts of a hot fresh liquor at 60° C., 0.5 part of 60% strength acetic acid is added and the mixture is heated to 80° C. After a treatment of 10 minutes at this temperature the liquor is discharged and the material is rinsed twice at 50° C. and twice at 80° C. It is then soaped at the boil for 15 minutes and rinsed with cold water to give a bright turquoise green dyeing.

EXAMPLE 5

100 parts of a desized and bleached cotton woven fabric are impregnated at a liquor pickup of 65% with an aqueous dyeing liquor containing in 1000 parts
40 parts of a mixture consisting of
50 parts of dyestuff 1.1
50 parts of dyestuff 2.1
50 parts of waterglass of spec. weight 1.5 and
7.5 parts of sodium hydroxide solution of spec. weight 1.5 in dissolved form.

The temperature of the liquor is 25° C. The fabric web impregnated with dyeing liquor is wound onto a batching roller, wrapped in polyethylene film and left there for 24 hours with slow rotation. It is then washed in an eight-box continuous open-width washer in accordance with the following scheme: two cold rinses, two warm rinses, two extractions at the boil, warm rinse, cold rinse.

This gives a level bright turquoise green dyeing having good fastness properties.

EXAMPLE 6

100 parts of a bleached woven cotton fabric are treated on a commercial short-liquor jet-dyeing machine with 500 parts of a hot dyeing liquor at 60° C. containing
30 parts of anhydrous sodium sulphate
10 parts of anhydrous sodium carbonate
2 parts of the dyestuff mixture consisting of
50 parts of dyestuff 1.1
50 parts of dyestuff 2.1 and
0.5 part of dyestuff 4.1 ($\lambda_{max}$=609 nm) of the formula

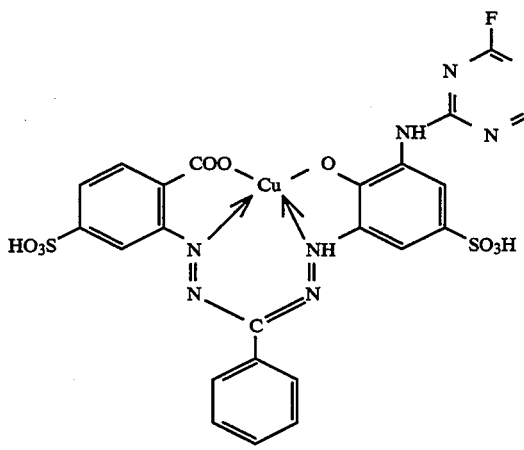

The bath is heated to 80° C. over a period of 20 minutes and maintained at this temperature for 60 minutes. After this time the liquor is discharged and the material is rinsed twice with 800 parts of a hot liquor at 60° C.

Fresh liquor is then added and heated to 95° C., followed by 20 minutes of extraction at the boil. After discharge of the wash liquor the dyed material is rinsed with cold water to give a level turquoise green dyeing having good fastness properties.

We claim:

1. Dyestuff mixture of at least two reactive dyestuffs having different reactive groups, characterized in that at least one Ni vinylsulphonylphthalocyanine dyestuff 1,

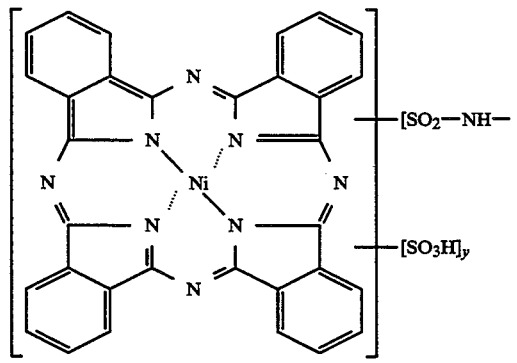

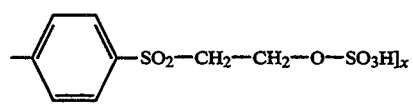

in which
x is 1 to 3,
y is 1 to 3,
x+y is about 3 to 4.
and at least one Ni fluoro-chloro-pyrimidinyl-phthalocyanine dyestuff 2 of the formulae 2.1 or 2.2

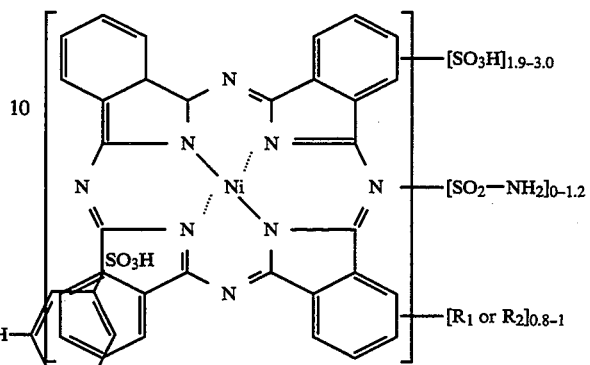

wherein

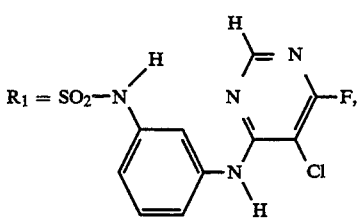

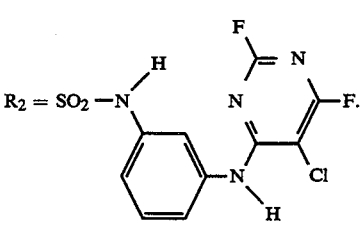

are contained therein, said mixture containing, based on the entire dyestuff content, from 40 to 60% by weight of said dyestuff 1 and from 40 to 60% by weight of said dyestuff 2.

2. Mixtures according to claim 1, characterized in that the dyestuff mixture additionally contains 1 to 50 parts of an inorganic salt per 100 parts of dyestuff.

3. Mixtures according to claim 1, additionally containing therein 1 to 5 parts of an inorganic buffer, 0.5 to 10 parts of a dispersant and 0.5 to 5 parts of a dedusting agent per 100 parts of the dyestuffs, and the mixture has a pH of 6.5 to 7.5.

4. Process for dyeing cellulose fibres or cellulose-containing fibre blends, which comprises dyeing said fibres or fibre blends with a reactive dyestuff mixture according to claim 1.

5. Fibre-containing textiles of cellulose or of a blend selected from the group consisting of polyester/viscose, polyester/linen, polyester/cotton, cotton/staple viscose and cotton/linen dyed with a reactive dyestuff mixture according to claim 1.

6. Mixture according to claim 1, characterized in that in addition there is present therein at least one dyestuff 4 of the formulae 4.1 to 4.3,

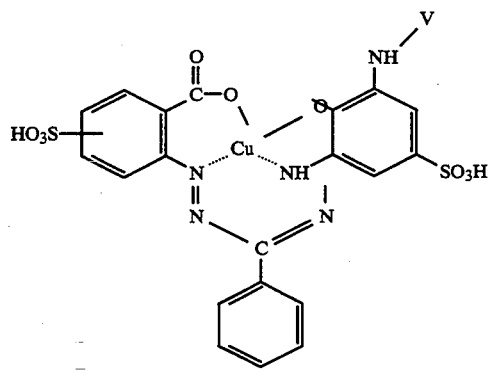

wherein V may be $V_1$–$V_3$ and in which

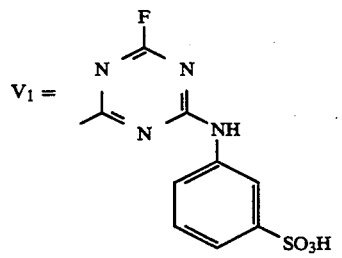

4.1

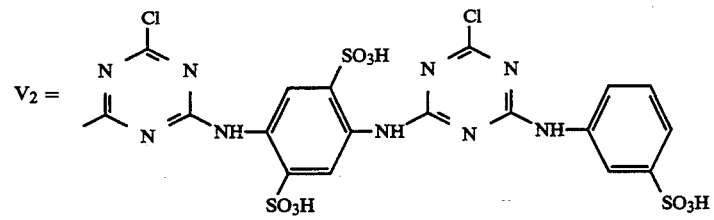

4.2

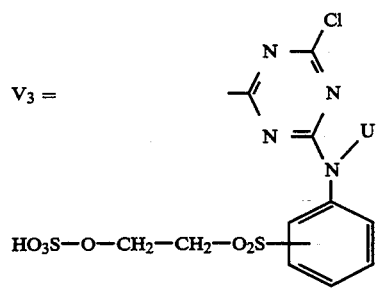

4.3 where U = H, $CH_3$ or —$C_2H$

7. Mixtures according to claim 1 which additionally contain at least one Ni chlorotriazinyl-phthalocyanine dyestuff 3 of the formula 3.1 or 3.2

3.1
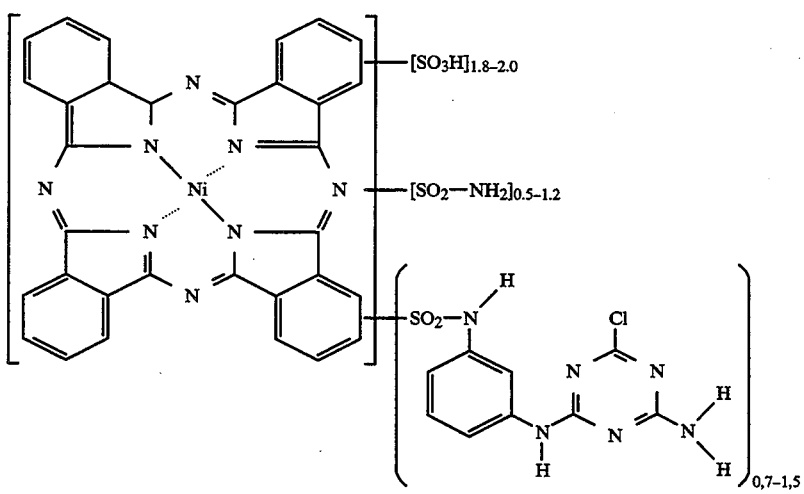
3.2
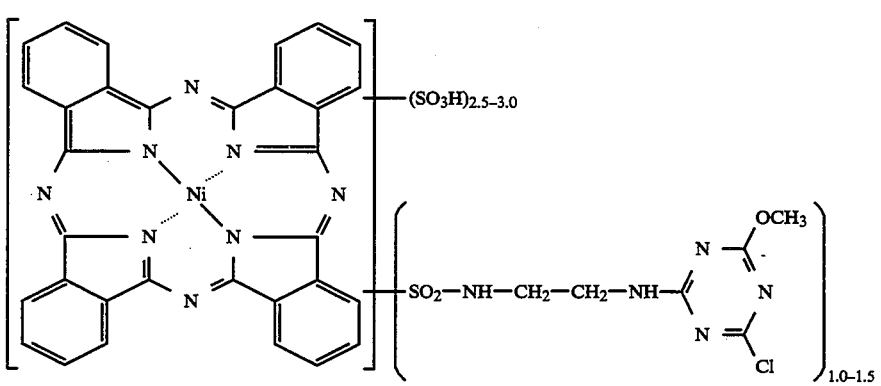
* * * * *